UNITED STATES PATENT OFFICE.

WALTER L. MELICK, OF COLUMBUS, OHIO.

PROCESS OF MAKING SODIUM ALUMINATE.

1,271,192.  Specification of Letters Patent. Patented July 2, 1918.

No Drawing. Application filed May 7, 1917. Serial No. 166,932.

*To all whom it may concern:*

Be it known that I, WALTER L. MELICK, a citizen of the United States, residing at Columbus, in the county of Franklin and State of Ohio, have invented certain new and useful Improvements in Processes of Making Sodium Aluminate, of which the following is a specification.

This invention relates to processes of making alkali metal aluminates from naturally occurring aluminum containing silicates and has particular reference to an improved process of making sodium aluminate from bauxite.

Heretofore in the production of alkali metal aluminates from naturally occurring aluminiferous minerals it has been found to be necessary to either furnace the mineral and an alkali or to digest such a mixture at a high pressure or to make use of additional reagents besides the alkali, or to preheat material entering into the process, to successively raise and lower the temperature within fixed limits during such process and to add the preheated material at predetermined points in this temperature variation. These disadvantages of prior processes of the character referred to very materially increase the expense of practising them.

Now I have discovered that by dissolving sodium hydroxid in a minimum amount of water whereby a substantially saturated solution of the alkali is obtained and adding to this very finely ground bauxite in such quantity that the resulting mixture is in the form of a thick paste or mud, I am able to produce sodium aluminate of good quality by heating the mixture prepared as specified, at atmospheric pressure and at a boiling temperature, water being added from time to time to maintain the consistency of the mixture.

In the practice of my process in its preferred embodiment I dissolve sodium hydroxid in a minimum amount of water thereby producing a substantially saturated solution of the alkali. To this solution I add the full charge of bauxite to be treated therewith, such bauxite being ground to a definite degree of fineness, from 70 to 80 mesh, preferably 80 mesh. The quantity of bauxite used should be such as to produce a thick paste or mud when added to the alkali. In mixing the alkali and the bauxite I prefer to add 175 pounds of the bauxite to each 100 pounds of the substantially saturated solution of sodium hydroxid.

The mixture is then heated to a boiling temperature under atmospheric pressure, water being added from time to time to maintain the consistency of the mixture. When the mixture begins to boil it assumes a frothy condition. At this point the heat is controlled so that the mixture is not subjected to increased heat. The heating is continued and the mixture stirred or otherwise agitated for preferably about two hours, after which the mixture is diluted with water and the sodium aluminate solution separated by decantation, filtration, or otherwise.

It is to be understood that potassium hydroxid is the equivalent of sodium hydroxid for use in my process. It is also to be understood that while I have set forth in detail the preferred procedure and proportions of ingredients, the details of procedure and the proportions of ingredients may be widely varied and that chemical equivalents of the reagents employed may be used without departing from the spirit of my invention or the scope of the subjoined claims.

Having thus described my invention, I claim:

1. The herein described process which consists in grinding bauxite to approximately from seventy to eighty mesh, adding the resulting powder to a substantially saturated solution of sodium hydroxid in such quantity as to produce a thick paste or mud, boiling the mixture at atmospheric temperature, maintaining the consistency of the mixture by the addition of water and separating the sodium aluminate formed from the balance of the mass.

2. The herein described process which consists in heating to its boiling point a mixture consisting of a substantially saturated solution of sodium hydroxid in water and ground bauxite of a degree of fineness of at least seventy mesh, the mixture having approximately the consistency of a thick paste or mud, boiling the mixture at atmospheric pressure, maintaining the consistency of the mixture by the addition of water, and finally separating the sodium aluminate formed from the remainder of the mass.

3. The herein described process which consists in heating to boiling a mixture of a charge of ground bauxite of a degree of fineness of about eighty mesh and a substantially saturated solution of sodium hydroxid, such mixture having substantially the consistency of a thick paste or mud, maintaining the consistency of the mixture by the addition of water, and finally separating the sodium aluminate formed from the remainder of the mass.

In testimony whereof I affix my signature in presence of two witnesses.

WALTER L. MELICK.

Witnesses:
CHESTER G. HAWLEY,
MARTIN F. TRACY.